United States Patent Office 3,704,280
Patented Nov. 28, 1972

3,704,280
ANIONIC CATALYTIC POLYMERIZATION OF LACTAMS IN THE PRESENCE OF AN ORGANIC ISOCYANATE AND A POLY-ETHER
Jozef L. M. van der Loos, Rijksweg Z, 146, and Peter J. M. W. Claassen, Eisenhowerstraat 373, both of Sittard, Netherlands
No Drawing. Filed Mar. 25, 1970, Ser. No. 22,684
Claims priority, application Netherlands, Mar. 25, 1969, 6904544
Int. Cl. C08g 20/10
U.S. Cl. 260—77.5 AM                                6 Claims

ABSTRACT OF THE DISCLOSURE

A process is disclosed for the anionic catalytic polymerization of lactams or mixtures of lactams in which an isocyanate compound is used as a promoter conducted in the presence of a polyether soluble in molten lactam. The resulting polymerization reaction occurs rapidly in the order of minutes, producing a polyamide of very high impact strength.

---

The present invention relates to a process for the anionic catalytic polymerization of lactams.

It is known that the anionic polymerization of lactams, which is usually accomplished by means of an alkali metal compound, can be speeded up considerably by adding a promoter. This promoter may consist of nitrogen compounds, such as isocyanates, carbodiimides and cyanamides. When these promoters are added, the polymerization can be carried out in a short time and at temperatures below the melting point of the resulting polyamide. Lactam molecules containing at least 4 carbon atoms in the ring can thus be made to yield a solid product having the shape of the reaction space in which the polymerization has been carried out.

It has also been proposed to use polyalkylene glycols for promoting this polymerization in U.S. Pat. No. 3,308,099. However, due to the long reaction times required by this process, such promoters are not attractive for practical applications.

It is also known that urethane-like reaction products of polyalkylene glycols and polyisocyanates can be used as promoters. According to this process, a molar excess of isocyanate must be used so that the resulting promoter reaction product will not contain OH groups. The polyamides obtained by this process have better mechanical properties—especially in higher impact strength (Izod value)—than those obtained using the customary promoters, such as the isocyanates.

According to the present invention, polyamides are obtained, which possess an even considerably higher impact strength than those of polyamides produced by the prior art.

A process for the anionic catalytic polymerization of lactams has now been found, wherein a lactam or a mixture of lactams is polymerized using an isocyanate compound containing at least one isocyanate group in its molecule as a promoter conducted in the presence of a polyether which is soluble in the molten lactam or mixture of lactams. The reaction time required is in the order of minutes, generally less than thirty. In the process according to the present invention, it is required that the absolute number of hydroxyl (OH) groups contained in the amount of polyether used is greater than the absolute number of isocyanate groups (NCO) contained in the amount of isocyanate used.

Further, according to the present invention, the amount of polyether to be employed is limited to at most 25% by weight of the amount of lactam to be polymerized. If larger amounts are used, the resulting polyamide products will have poor mechanical properties. In most cases the amount of polyether applied is about from 5 to about 36% by weight with respect to the amount of the lactam.

The amount of isocyanate can be more varied, and is generally equal to the amount of promoter customarily used in the anionic polymerization, that is about 0.1–2 mole percent with respect to the lactam.

Choice of the amounts of polyether and isocyanate must, however, be such that the absolute number of OH groups will always be greater than the absolute number of isocyanate groups, in order that the polyamide products obtained will have the desired improved properties resulting from the present invention. It is preferred that the amounts of polyether and isocyanate are such that the ratio of the total absolute number of OH groups to the total absolute number of NCO groups is in the range from about 1.05:1 to about 3:1.

Examples of isocyanates suitable for use in the process according to the present invention are: phenyl isocyanate, hexamethylene diisocyanate, tetramethylene diisocyanate, toluene diisocyanate, 1,2-diisocyanatomethyl cyclobutane and triisocyanatophenyl methane.

Examples of lactam-soluble polyethers are polytetrahydrofuran, polyepichlorhydrin, polyglycidyl ether, polyethylene glycol, polypropylene glycol, copolymers of ethylene glycol and propylene glycol, and alkyl-phenoxy-polyethylene oxide-ethanol. These polyethers are soluble in molten lactam, as long as the molecular weight of the polyether is not excessively high, such as, for example, over 20,000. Such high molecular weight polymers are not only insoluble in the lactam, but are generally unsuited for use in the process according to the present invention.

In the anionic catalytic polymerization of lactams, the catalyst is used in the presence of the above promoter. Catalysts for this type of polymerization are lactam-N-anions, which may be obtained from lactam-metal compounds having a metal atom bound to their nitrogen atom, for instance sodium caprolactam. Examples of substances which form lactam-N-anions upon reaction with a lactam are: metal-alkyl compounds, such as diisobutyl aluminium hydride, triethylaluminium, diethyl aluminum chloride triisopropyl aluminium, diethyl zinc, and alkali-metal alkyls; alkali metals, alkaline-earth metals, and alkaline compounds of those metals, such as hydrides, oxides, hydroxides, alkanolates and carbonates; and Grignard compounds, such as alkyl magnesium bromide and aryl magnesium bromide.

The amount of substance yielding lactam-N-anions can be varied within wide limits. Usually, 0.1–5 moles percent of the catalyst, with respect to the amount of monomer to be polymerized, is employed, but larger amounts of the order of 5–10 moles percent, can also be used.

The temperature at which the polymerization is performed can be within the range customarily employed for the anionic polymerization of lactams, which is generally between 90 and 250° C. An initial temperature of 125–175° C. is preferred, in which case, due to exothermic polymerization reaction, the temperature can rise during the reaction. However, the reaction temperature generally remains below 200–215° C. When the process is carried out in this manner, the polymerization reaction according to the present invention is completed within a vary short time, often in less than 15 minutes.

If exogenous heat is applied to the polymerization reaction (which heat is below the melting point of the polymer to be produced), the polymerization reaction yields solid macromolecular end products in the form of shaped products whose dimensions correspond to those of the reaction space in which the polymerization has been conducted.

The polymerization may be applied to an omega lactam containing from 4 to 16 carbon atoms, such as butyrolactam, caprolactam, oenantholactam, caprylolactam decyl lactam, undecyl lactam or laurolactam. However, it is also possible to polymerize mixtures of two, three, or more lactams. The structure and the properties of the resulting polyamides can be influenced through the composition of the monomer mixture used as the starting material.

The process provided by the present invention is further illustrated by the following examples, which is not, of course, being limited thereto.

In the following polymerization experiments, the results of which are shown in Tables 1 and 2, both the polymerization time and the impact strength (Izod value) were measured.

The polymerization time was calculated on the amount of 20 g. of the selected lactam, polymerized in a glass cylinder (diameter 2.5 cm.), which resulted in the formation of a bar. The isocyanate was dissolved in 10 g. of lactam, at a temperature of 160° C. Thereafter, the resulting solution was added to a solution of sodium hydride and polyether in 10 g. of ε-caprolactam, which was maintained at 160° C. The elapsed time—calculated from the addition of the respective promoter until the resulting bar was free of the cylinder was measured and stated in the following tables as the polymerization time.

For measuring the impact strength (Izod value), a quantity of lactam (113 g.) was polymerized in a flat aluminium mold, which resulted in the formation of a plate having the approximate dimensions: length 15 cm., width 15 cm., thickness 0.3 cm. For this experiment, the selected isocyanate was dissolved in about one half of the quantity of the lactam. In the remaining half of the quantity of the lactam, first sodium hydride and then the selected poly-ether were dissolved. The two solutions were maintained at a temperature of 100° C., then compressed and poured into the mould, which was maintained at 160° C. After 20 minutes the plate resulting from the above polymerization reaction was removed from the mould. In order to condition it, the plate was hung for 7 days in a controlled environment having the temperature thereof maintained at 70° C. and a relative humidity of 65%. Thereafter the plate was hung for 7 days in a similarly controlled environment but at a lower humidity of 65%.

Specimens needed for determining the reported impact strength were obtained by sawing from the conditioned plate. The impact strength (Izod value) was measured according to standard No. D256-56 of the American Society for Testing Materials (ASTM).

The percentages given in the tables are related to caprolactam. In Table 2, where a + has been inserted instead of a numerical Izod value, calculation of this value appeared impossible to determine; during the measurement the particular specimens did not rupture.

TABLE 1.—POLYMERIZATION OF ε-CAPROLACTAM

| Polyether | | | Isocyanate promoter | | NaH catalyser, moles, percent | Polymerization time, min. | Impact strength [1] | |
|---|---|---|---|---|---|---|---|---|
| Name | Percent by weight | —OH, moles, percent | Name | —NCO, moles, percent | | | Before conditioning | After conditioning |
| | | | Hexamethylene diisocyanate. | 0.5 | 0.5 | 8.5 | 3.3 | 17 |
| | | | do | 0.75 | 0.75 | | 4.2 | 21 |
| | | | do | 1.0 | 1.0 | 6.0 | 5.0 | 21 |
| | | | do | 1.0 | 1.5 | | 3.9 | 16 |
| Polyethylene glycol 1000 | 10 | 2.22 | do | 1.0 | 1.0 | 7.6 | | |
| Polyethylene glycol 3000 | 10 | 0.81 | do | 0.5 | 0.5 | | 9.2 | 87 |
| Do | 10 | 0.81 | do | 0.75 | 0.75 | | 7.0 | 43 |
| Polypropylene glycol 2000 | 10 | 1.13 | do | 0.4 | 0.4 | 7.1 | 8.9 | 125 |
| Do | 10 | 1.13 | do | 0.75 | 0.75 | | 9.9 | 81 |
| Do | 5 | 0.57 | do | 0.5 | 0.5 | | 8.3 | 93 |
| Do | 10 | 1.13 | do | 1.0 | 1.0 | | 8.8 | 56 |
| Do | 20 | 2.26 | do | 1.0 | 1.0 | | 11.0 | 104 |
| Do | 10 | 1.13 | do | 1.0 | 1.5 | 6.5 | 8.9 | 87 |
| Do | 20 | 2.26 | do | 1.0 | 1.5 | | 10.7 | 105 |
| Polytetrahydrofuran | 8 | 1.12 | do | 0.75 | 0.75 | | 8.7 | 110 |
| Nonyl-phenoxy-polyethylene oxide-ethanol | 12 | 0.87 | do | 0.5 | 1.0 | | 8.1 | 88 |
| Do | 10 | 0.89 | do | 0.75 | 0.75 | | 7.7 | 75 |
| Polypropylene glycol 2000 | 5 | 0.57 | Phenyl isocyanate | 0.3 | 0.3 | | 5.8 | 103 |
| Do | 10 | 1.13 | do | 1.0 | 1.0 | 4.5 | | |
| Nonylphenoxy-polyethylene oxide-ethanol | 10 | 0.74 | Toluene diisocyanate | 0.7 | 0.7 | 8.4 | | |
| Do | 20 | 1.47 | do | 0.7 | 0.7 | 13.3 | | |
| Polypropylene glycol 2000 | 10 | 1.13 | do | 1.0 | 1.0 | 7.4 | | |

[1] Izod value (kg./cm.²).

TABLE 2.—POLYMERIZATION OF MIXTURES OF ε-CAPROLACTAM AND LAUROLACTAM

| Laurolactam, moles, percent | Polyether | | | Isocyanate promoter | | NaH catalyser, moles, percent | Impact strength [1] | |
|---|---|---|---|---|---|---|---|---|
| | Name | Percent by weight | —OH, moles, percent | Name | —NCO, moles, percent | | Before conditioning | After conditioning |
| 5 | | | | Hexamethylene diisocyanate. | 1.0 | 1.0 | 3.7 | 19.0 |
| 10 | | | | do | 1.0 | 1.0 | 4.5 | + |
| 20 | | | | do | 1.0 | 1.0 | [2] 10.4 | + |
| 20 | | | | do | 0.5 | 0.5 | [2] 9.2 | + |
| 5 | Polypropylene glycol 2000 | 10 | 1.13 | do | 1.0 | 1.0 | 10.4 | + |
| 10 | do | 10 | 1.13 | do | 1.0 | 1.0 | 13 | + |
| 20 | do | 10 | 1.13 | do | 1.0 | 1.0 | 32 | + |
| 20 | do | 5 | 0.57 | do | 0.5 | 0.5 | 21 | + |
| 20 | do | 10 | 1.13 | do | 0.5 | 0.5 | 19 | + |

[1] Izod value (kg./cm.²).
[2] Damage to surface, due to adhesion to wall.

What is claimed is:

1. A process for the anionic catalytic polymerization of lactams to form the corresponding polyamide which comprises dissolving an organic isocyanate promoter in at least one lactam, or mixture of lactams, and thereafter polymerizing in the presence of polyether having a molecular weight less than 20,000 and which is soluble in said molten lactam, the amount of said polyether being from about 5% to about 25% by weight of said lactam, the ratio of the absolute number of OH groups present in the amount of said polyether to the absolute number of NCO groups present in the amount of said isocyanate promoter compound is greater than 1, and the required reaction time is less than about 30 minutes.

2. The process according to claim 1 wherein the said ratio of the absolute number of OH groups to the absolute number of NCO groups is from about 1.05:1 to about 3.0:1.

3. The process according to claim 1 wherein said isocyanate promotor compound is selected from the class consisting of phenylisocyanate, hexamethylene, diisocyanate, tetramethylene diisocyanate, toluene diisocyanate, 1,2-diisocyanate cyclobutane and triisocyanatophenyl methane.

4. The process according to claim 1 wherein said lactam-soluble polyether is selected from the class consisting of polytetrahydrofuran, polyepichlorhydrin, polyglycidyl ether, polyethylene glycol, polypropylene glycol, the copolymer of ethylene glycol and propylene glycol, and nonyl-phenoxy-polyethylene oxide-ethanol.

5. The process according to claim 1 wherein the polyamide is made by the polymerization of ε-caprolactam.

6. The process according to claim 1 wherein the polyamide is made by the polymerization of a mixture comprising ε-caprolactam and laurolactam.

References Cited

UNITED STATES PATENTS

| | | | |
|---|---|---|---|
| 3,320,335 | 5/1967 | Hedrick et al. | 260—78 |
| 3,308,099 | 3/1967 | Mermoud et al. | 260—78 |
| 3,028,369 | 4/1962 | Butler et al. | 260—78 |
| 3,484,415 | 12/1969 | Sahler | 260—78 |

DONALD E. CZAJA, Primary Examiner

E. C. RZUCIDLO, Assistant Examiner

U.S. Cl. X.R.

260—78 L, 858